Patented Apr. 19, 1938

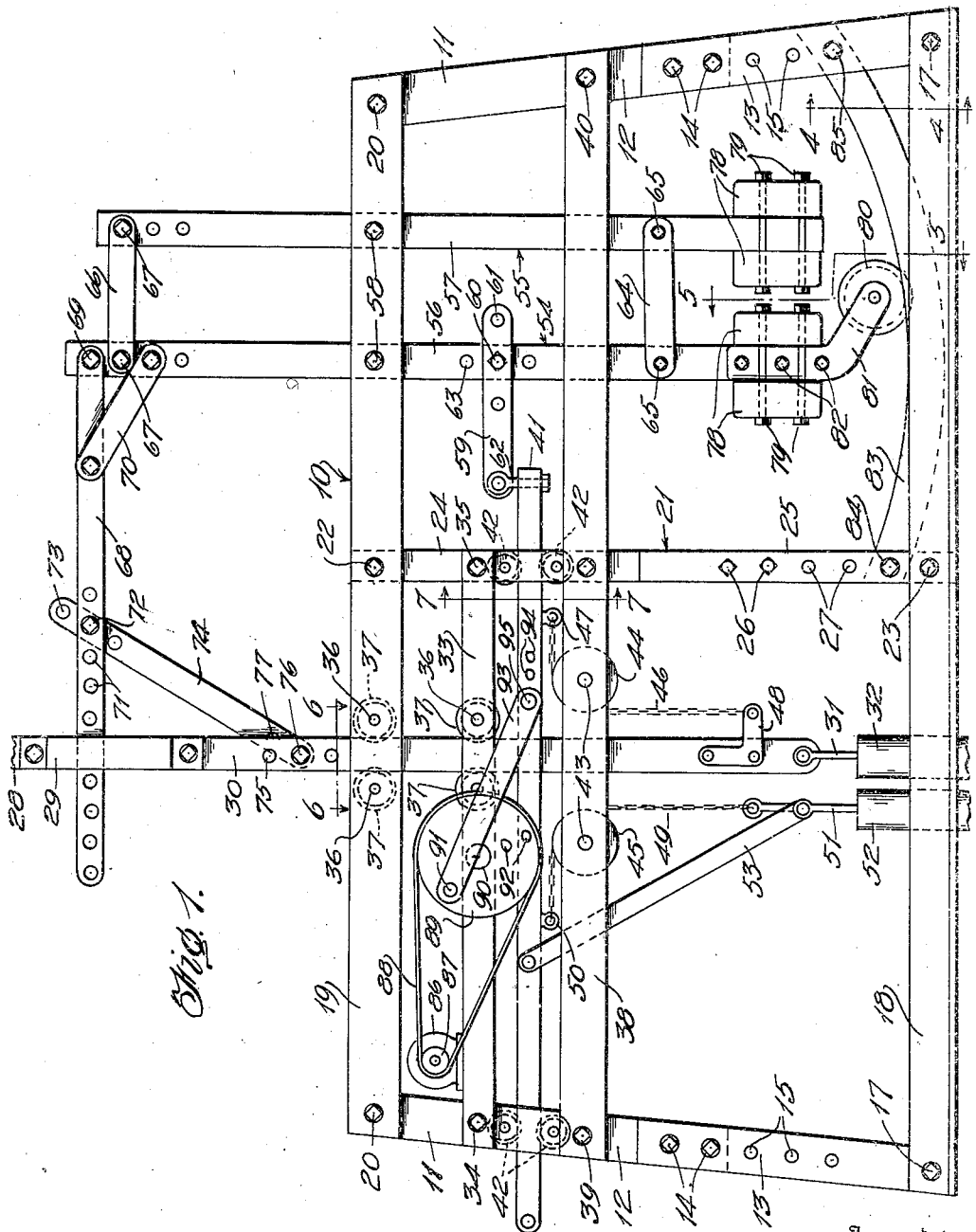

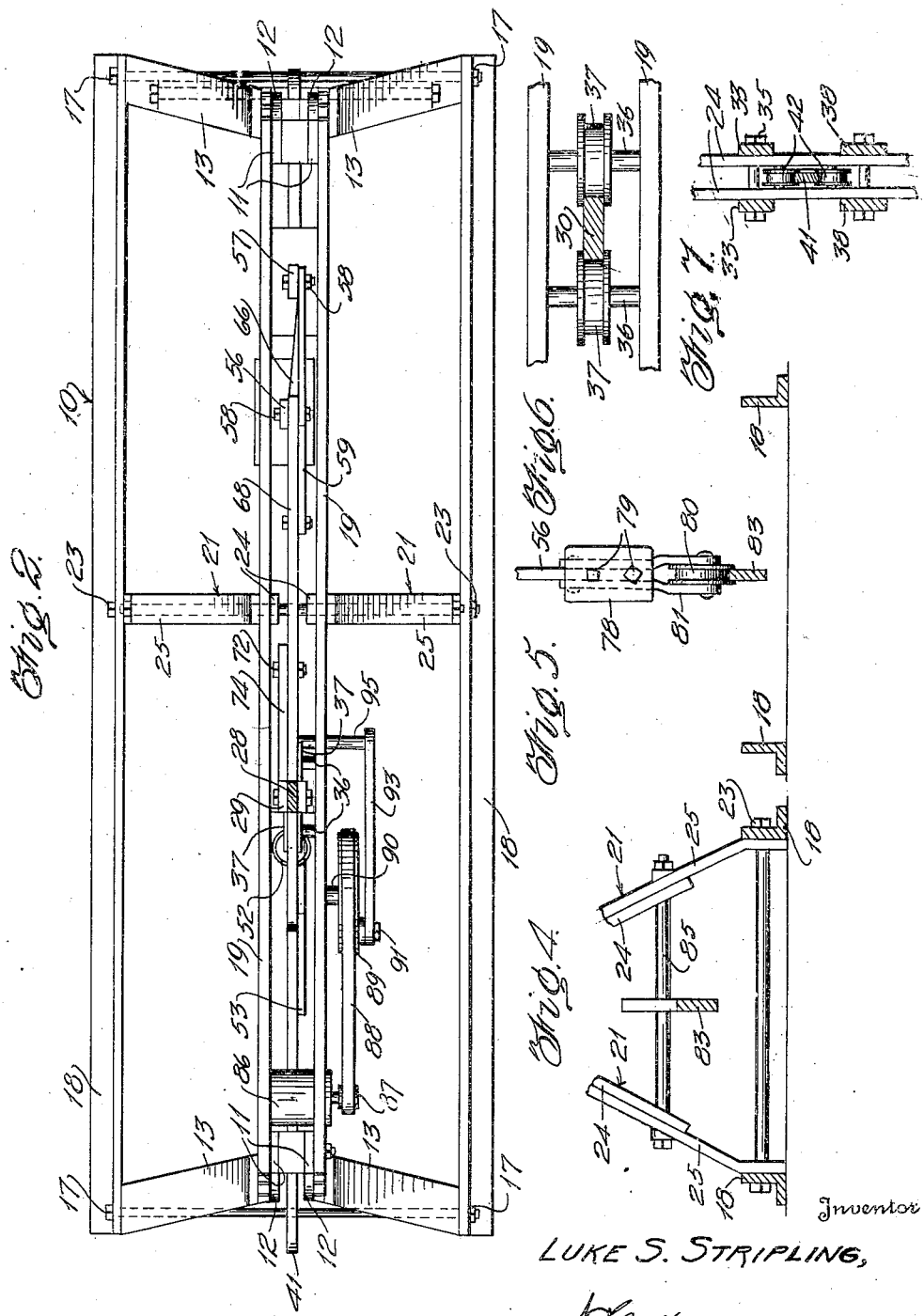

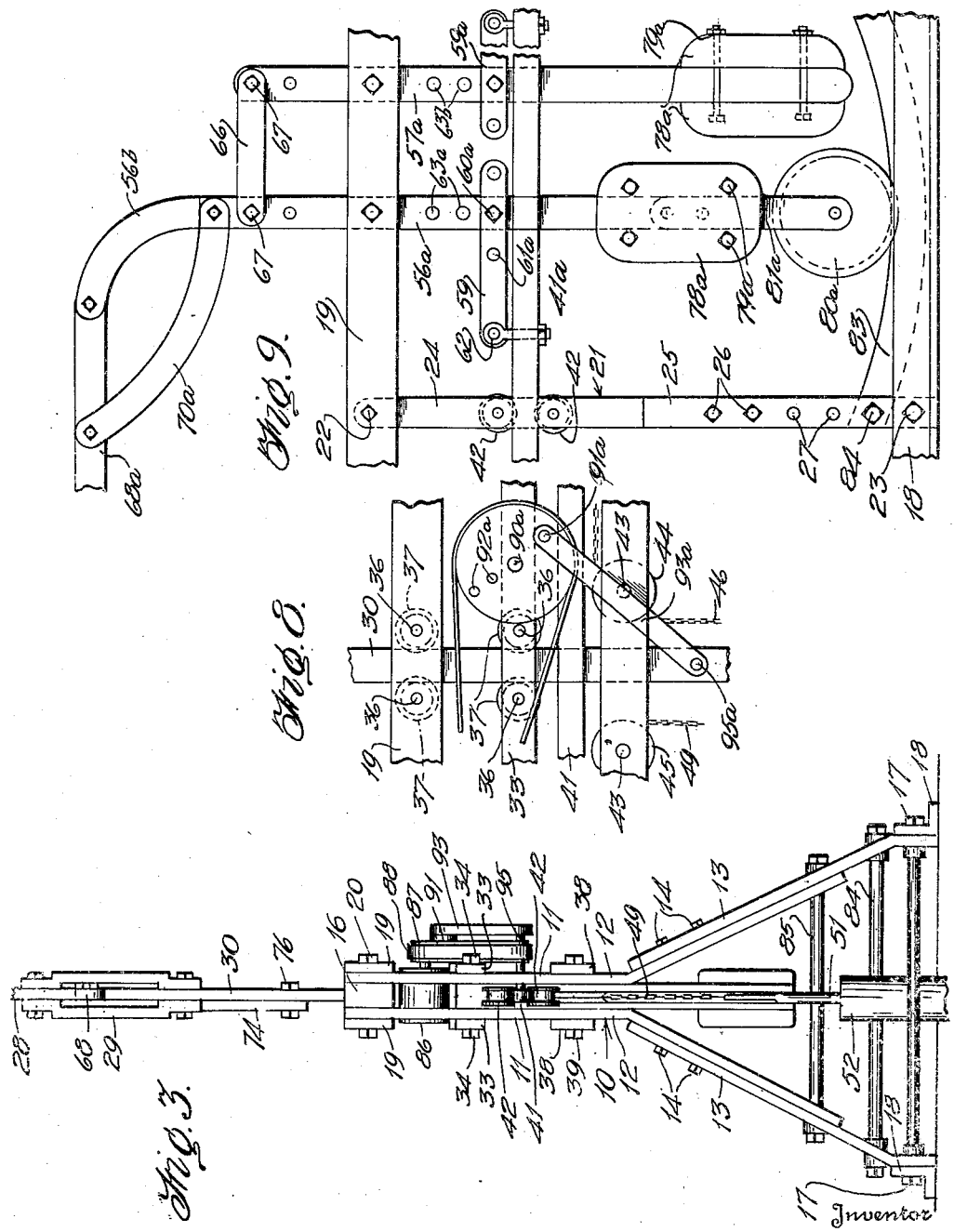

2,114,751

UNITED STATES PATENT OFFICE 2,114,751

POWER CONTROL FOR WINDMILLS

Luke S. Stripling, Amarillo, Tex., assignor of one-fourth to H. Ernest Smith, Amarillo, Tex.

Application September 1, 1937, Serial No. 162,055

18 Claims. (Cl. 103—207)

This invention relates to windmills and the like and has special reference to a power control for windmills.

More particularly the invention relates to a windmill power control of the general type shown and described in my prior application for Power controlling means for windmills, filed February 3, 1937 and bearing the Serial No. 123,900.

One important object of the invention is to provide an improved structure of this character and to simplify the construction of my prior invention.

A second important object of the invention is to provide an increased efficiency over my prior structure.

A third important object of the invention is to provide novel means whereby two pump cylinders may be simultaneously operated and controlled.

A fourth important object of the invention is to improve the pendulum mechanism of my prior invention.

A fifth important object of the invention is to provide a device of this character arranged to prevent sudden fluctuations in the pumping action of the windmill.

A sixth important object of the invention is to provide a novel pendulum control for windmills wherein sudden fluctuations in wind velocity will be prevented from causing similar fluctuations in the speed of pumping mechanism actuated by the windmill.

A seventh important object of the invention is to utilize in a novel manner as a governor for pumping mechanism actuated by a windmill, the well known law of pendulums whereby all oscillations of a pendulum of given length require the same time interval independent of the force exerted in oscillating the pendulum.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Fig. 1 is a side elevation of the improved device.
Fig. 2 is a plan view thereof.
Fig. 3 is an end view thereof.
Fig. 4 is a section on the line 4—4 of Fig. 1.
Fig. 5 is a section on the line 5—5 of Fig. 1.
Fig. 6 is an enlarged section on the line 6—6 of Fig. 1.

Fig. 7 is an enlarged section on the line 7—7 of Fig. 1.

Fig. 8 is a detail side elevation of a modified manner of connecting a certain auxiliary power means with the remainder of the mechanism.

Fig. 9 is a detail side elevation disclosing a modified pendulum arrangement.

In the embodiment of the invention illustrated in the accompanying drawings it will be seen that the invention includes a supporting frame indicated in general at 10. This frame includes a pair of end frames each of which includes a pair of spaced parallel upper leg members 11 having downwardly diverging lower portions 12. Upwardly converging lower leg members 13 rest against the outer faces of the portions 12 and are secured in adjusted relation thereto by bolts 14 passing selectively through bolt holes 15. Spacer blocks 16 are located between the upper ends of the members 11. The lower ends of each end pair of leg members 13 are connected by a tie rod 17 which passes through the members 13. The respective ends of the two tie rods are connected by longitudinally extending base angles or sills 18. The upper ends of each side pair of legs 11 are connected by upper longitudinal frame members 19, bolts 20 passing through the upper ends of legs 11, the ends of members 19 and spacers 16. Intermediate upright frame members 21 are secured to the members 19 by bolts 22 and to the sills 18 by bolts 23. These members 21 are adjustable for height like the end frames, each member 21 consisting of an upper section 24 and a lower section 25 secured in adjusted position by bolts 26 selectively positioned in spaced bolt holes 27.

A sucker-rod or bar 28 extends downwardly from the crankshaft (not shown) of any desired windmill and has its lower end bolted between the upper ends of a pair of yoke members 29 which have their lower ends bolted to the upper end of a sucker-rod extension 30 which in turn has its lower end connected to the upper end of a pump rod 31 working in a pump cylinder 32. Below and parallel to the members 19 is a pair of intermediate frame members 33 which are secured to the left hand members 11 by bolts 34 and to the uprights 21 by bolts 35. The sucker rod extension 30 passes downwardly between the pair of members 19 and between the pair of members 33. Between the members 19 and between the members 33 extend short shafts 36 whereon are mounted flanged rollers 37 which engage and guide the sinker rod extension 30.

Lower longitudinal frame members 38 are arranged parallel to the members 19 and are connected at their ends to the members 11 by bolts 39 and to the members 21 by bolts 40. A reciprocating pump actuating rod 41 is located parallel to and intermediate the members 33 and the members 38 and its ends pass respectively between the left hand members 11 and between the members 21. This rod is supported between vertically spaced pairs of flanged guide rollers 42, one pair being supported between members 11 and the other pair being supported between members 21. Extending through the members 38 on opposite sides of the sucker-rod extension 30 is a pair of shafts 43 on which are supported grooved chain pulleys 44 and 45. Around the pulley 44 extends a chain 46 which has one end anchored to the member 41 by an eyebolt 47 and has its other end anchored to the bracket 48 carried by the lower portion of the rod 30. The pulley 45 carries a chain 49 which has one end anchored to the rod 41 by an eyebolt 50 and its other end anchored to the upper end of the rod 51 of a second pump cylinder, 52. The rods 41 and 51 are also connected by diagonally extending links 53 pivoted at the ends of the respective rods. With this construction reciprocation of the rod 41 pulls alternately on the chains 46 and 49 and thus alternately raises the pump rods 31 and 51. The depression of the rod 31 is effected by the descent of the sucker rod 28 and the descent of the rod 51 is effected by the downward thrust of the link 53 as the rod 41 moves to the right as shown in Fig. 1.

In order to reciprocate the rod 41 there is provided a pair of weighted pendulums 54 and 55 having respectively the stems 56 and 57. These stems extend in an upright direction between the members 19 and pivots 58 pass through these stems 56 and 57 and are held in the members 19. A link 59 is pivotally mounted by a bolt 60 on the stem 56, the bolt being selectively positioned in one of a series of spaced bolt holes 61 formed in the link 59 to adjust the longitudinal position of the link and thus, through the bracket 62 connecting the link and rod 41, adjusting the longitudinal disposition of the rod 41 which in turn adjusts the vertical positions of the pump rods 31 and 51. Also the pivot bolt 60 is selectively insertable in any one of a series of bolt holes 63 formed in the stem 56 for the purpose of adjusting the length of the lever arm extending from the axis of pivot 58 to pivot 60. The lower portions of the stems 56 and 57 are connected by a link 64 having its ends secured to said stems by pivot bolts 65. Similarly the upper ends of the stems 56 and 57 are connected by a link 66 and pivot bolts 67. One end of a rocker arm 68 is secured to the upper extremity of stem 56 by a bolt 69. A diagonal brace 70 connects the stem 56 and arm 68 to maintain proper angular relation between said stem and arm. The arm 68 extends through the yoke 29 at its other end portion and this end is provided with a series of spaced bolt holes. Pivot bolt 72 may be positioned in a selected bolt hole and extend through a selected bolt hole 73 in one end of a link 74. The member 30 is provided with a series of bolt holes 75 through a selected one of which passes a pivot bolt 76 which also passes through a selected bolt hole 77 forming one of a plurality of such holes in the lower end of the link 74.

Pendulum weights 78 are secured on the lower ends of the respective stems 56 and 57 by bolts 79, the weights being preferably masses of concrete. A flanged guide roller 80 is journalled in a fork member 81 which is secured to the lower end of the stem 56 by bolts 82, the lower end of the fork being inclined to cause the roller 80 to lie intermediate the stems 56 and 57 as clearly shown in Fig. 1. An arcuate guide bar or rail 83 is arranged concentric to the pivotal axis of the stem 56 and is supported at one end by a tie rod 84 carried by the members 25 and at its other end by a tie rod 85 carried by the legs 12 at the right hand of Fig. 1. The roller 80 runs on this rail and the pendulum 54 is thereby prevented from lateral oscillation such as might be caused by high cross winds.

In order to assist the windmill or even to operate the device when there is no wind auxiliary motor means are provided. At 86 is a motor which may be an electric motor or a gas or oil engine. This motor is provided with a belt pulley 87 connected by a belt 88 with a crank disc 89. This crank disc is carried by a shaft 90 journalled in the members 33 and is provided with a crank pin 91 selectively positioned in one of a series of pin holes 92 arranged at graduated distances from the shaft 90 so that the throw of the disc may be adjusted. A link 93 connects the pin 91 with a selected one of a series of bolt holes 94 formed in the rod 41 by means of a bolt 96. Thus the position of the bar 41 relative to the crank disc may be adjusted.

In Fig. 8 is shown a modification of the crank disc connection. In this arrangement the parts are identical with those shown in Fig. 1 except that there is provided a link 93a which is carried by the crank pin 91 and is connected to the member 30 by a pivot bolt 95a.

In Fig. 9 the modified arrangement is such that the bar 41 is replaced by a long bar 41a which is not only connected to a selected bolt hole 53a of the stem 56a as before but is also similarly connected to a selected bolt hole 63b of the stem 57a by a link 59a. In this form the fork 81 is replaced by a straight fork 81a which brings the roller 80 directly below the stem 56a. Further, the upper end of the stem 56a is curved as at 56b for connection to a rock arm 68a substantially identical with the arm 68 and the straight brace 70 is replaced by a curved brace 70a.

In operation reciprocation of the sucker rod causes the arm 68 to oscillate the pendulum 54 which, through its link connection oscillates the pendulum 55. The linkage connection of these pendulums with the bar 41 reciprocates this bar and causes alternate raising of the pump rods 31 and 51, these being depressed by the action of the sucker rod and link 53.

By reason of the law of pendulum oscillation, once the sucker rod has been started to reciprocate and as long as it continues to reciprocate sudden increases or drops in the velocity of the wind actuating the windmill will not correspondingly affect the speed of reciprocation of the sucker rod since tendency to speeding up of the rod movement will be damped by the pendulums and tendency to dropping of the speed will be compensated by the inertia of the pendulums. The device will thus operate at a constant close approximation to the speed due to mean wind velocity.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, and an operative connection between said pendulum and bar.

2. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, and arcuate guide means for the lower end of said pendulum.

3. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, a grooved roller carried by the lower end of said pendulum, and an arcuate guide rail for said roller fixed in said frame concentric to the pivoted axis of said pendulum.

4. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, a link having one end pivoted to the bar adjacent said pendulum, and means for connecting the other end of said link to the pendulum at a selected distance from the pivoted axis of the pendulum.

5. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, a link having one end pivoted to the bar adjacent said pendulum, means for connecting the other end of said link to the pendulum at a selected distance from the pivotal axis of the pendulum, and arcuate guide means for the lower end of said pendulum.

6. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, a link having one end pivoted to the bar adjacent said pendulum, means for connecting the other end of said link to the pendulum at a selected distance from the pivoted axis of the pendulum, a grooved roller carried by the lower end of said pendulum, and an arcuate guide rail for said roller fixed in said frame concentric to the pivoted axis of said pendulum.

7. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, and a diagonal thrust link connecting the horizontal bar with the upper end of the other pump rod.

8. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, and a diagonal thrust link connecting the horizontal bar with the upper end of the other pump rod, and arcuate guide means for the lower end of said pendulum.

9. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a grooved roller carried by the lower end of said pendulum, and an arcuate guide rail for said roller fixed in said frame concentric to the pivotal axis of said pendulum.

10. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a link having one end pivoted to the bar adjacent said pendulum, and means for connecting the other end of said link to the pendulum at a selected distance from the pivotal axis of the pendulum.

11. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a link having one end pivoted to the bar adjacent said pendulum, means for connecting the other end of said link to the pendulum at a selected distance from the pivotal axis of the pendulum, and arcuate guide means for the lower end of said pendulum.

12. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, means for connecting the other end of said link to the pendulum at a selected distance from the pivotal axis of the pendulum, a grooved roller carried by the lower end of said pendulum, and an arcuate guide rail for said roller fixed in said frame concentric to the pivotal axis of said pendulum.

13. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a second weighted pendulum pivoted in said frame parallel to the first pendulum, and link means connecting said pendulum to cause them to swing in unison.

14. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a second weighted pendulum pivoted in said frame parallel to the first pendulum, link means connecting said pendulum to cause them to swing in unison, and arcuate guide means for the lower end of said pendulum.

15. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a second weighted pendulum pivoted in said frame parallel to the first pendulum, link means connecting said pendulum to cause them to swing in unison, a grooved roller carried by the lower end of said pendulum, and an arcuate guide rail for said roller fixed in said frame concentric to the pivotal axis of said pendulum.

16. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a second weighted pendulum pivoted in said frame parallel to the first pendulum, link means connecting said pendulum to cause them to swing in unison, a link having one end pivoted to the bar adjacent said pendulum, and means for connecting the other end of said link to the pendulum at a selected distance from the pivotal axis of the pendulum.

17. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a second weighted pendulum pivoted in said frame parallel to the first pendulum, link means connecting said pendulum to cause them to swing in unison, a link having one end pivoted to the bar adjacent said pendulum, means for connecting the other end of said link to the pendulum at a selected distance from the pivotal axis of the pendulum, and arcuate guide means for the lower end of said pendulum.

18. In a windmill having a vertically reciprocating element, a power controlling device including an elongated supporting frame, a horizontal bar mounted for reciprocation longitudinally in said frame, a pendulum pivoted intermediate its ends in the upper part of said frame and arranged to oscillate in a vertical plane extending longitudinally of the frame, said pendulum having its lower end weighted, an operative connection between said vertically reciprocating element and said pendulum, a pair of vertical pumps each including a pump rod, idler pulleys supported in said frame on opposite sides of said vertical element, chains connected to the upper ends of said pump rods and extending divergingly over said pulleys and having their ends connected to said horizontal bar, an operative connection between said pendulum and bar, said vertical element having its lower end connected to the upper end of one of said pump rods, a diagonal thrust link connecting the horizontal bar with the upper end of the other pump rod, a second weighted pendulum pivoted in said frame parallel to the first pendulum, link means connecting said pendulum to cause them to swing in unison, a link having one end pivoted to the bar adjacent said pendulum, means for connecting the other end of said link to the pendulum at a selected distance from the pivotal axis of the pendulum, a grooved roller carried by the lower end of said pendulum, and an arcuate guide rail for said roller fixed in said frame concentric to the pivotal axis of said pendulum.

LUKE S. STRIPLING.